Feb. 27, 1973 W. M. TERRY 3,718,189
CONSOLIDATION OF INCOMPETENT FORMATIONS
Filed July 30, 1969

INVENTOR.
WILLIAM M. TERRY
BY James E. Reed
ATTORNEY

3,718,189
CONSOLIDATION OF INCOMPETENT FORMATIONS
William M. Terry, Houston, Tex., assignor to Esso Production Research Company
Filed July 30, 1969, Ser. No. 845,978
Int. Cl. E21b 43/25, 43/16
U.S. Cl. 166—305                                                    1 Claim

ABSTRACT OF THE DISCLOSURE

A method for the injection of two or more reactive liquids, a resin and a catalyst for example, into a well in sequence wherein at least one of the reactive liquids is surrounded by an annular stream of an inert, substantially immiscible liquid of lower viscosity as it moves downwardly in the wellbore.

BACKGROUND OF THE INVENTION

(1) Field of the invention

This invention relates to operations requiring the injection of two or more reactive liquids into a well in sequence and is particularly concerned with the use of resin and catalyst or curing agent solutions for the consolidation of incompetent formations surrounding oil wells, gas wells, and similar boreholes.

(2) Description of the prior art

Methods for the consolidation of incompetent formations surrounding oil and gas wells frequently involve the injection of a resinous liquid into the formation, the introduction of an inert fluid to displace and distribute the resinous material, and the subsequent injection of a catalyst or curing agent to harden the injected resin and thus bond the sand grains in place. Experience has shown that such methods sometimes present difficulties because of the accumulation of gummy residues that tend to plug the perforations and the face of the producing formation. The residues are apparently formed by interaction of the catalyst or curing agent with small amounts of the resinous material that adhere to the tubing or casing during the initial injection step and are not swept away by the inert flushing agent. The presence of even small amounts of such a residue may interfere with the proper placement of the materials and prevent successful consolidation of the incompetent formation. The use of wiper plugs and related devices has not eliminated this problem. Other operations in which reactive chemicals are used present similar difficulties.

SUMMARY OF THE INVENTION

This invention provides an improved method for the injection of two or more reactive materials into a well in sequence which at least in part avoids the difficulties referred to above. In accordane with the invention, it has now been found that problems due to the accumulation of resin solutions or other reactive liquids on the pipe wall and in the collar recesses during sand consolidations and similar operations can be alleviated by surrounding at least one of the reactive liquids with an annular film or layer of an inert, substantially immiscible liquid of lower viscosity. The reactive fluid and inert liquid will preferably be introduced into the pipe at the earth's surface by means of an injector in which parallel flow of a central stream of the reactive material and an annular stream of the inert liquid is established before the streams contact one another. Other methods for introducing the fluids can also be used. Under the dynamic conditions existing within the pipe as the fluids move downwardly, the inert fluid maintains its position adjacent the pipe wall and thus isolates the reactive material. This prevents the accumulation of reactive material on the wall surfaces and in the collar recesses and avoids the formation of reaction products that might otherwise occur as a result of the sequential injection of two or more such materials.

DESCRIPTION OF THE PREFERRED EMBODIMENTS

Figure 1:
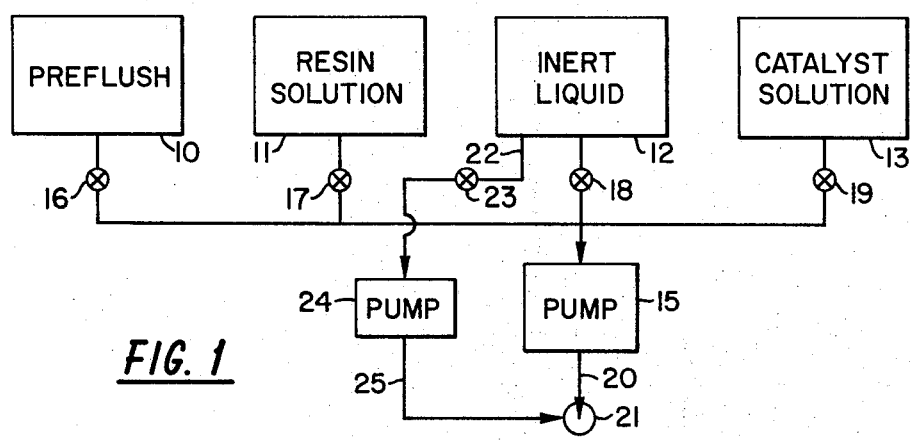
FIG. 1 in the drawing is a schematic diagram of illustrating apparatus useful in sand consolidation operations carried out in accordance with the invention.

A variety of different resinous materials may be used in sand consolidation operations carried out in accordance with the invention. Phenol-formaldehyde type resins prepared by the reaction of formaldehyde, acetaldehyde, propionaldehyde or a mixture of water-soluble aldehydes with a low molecular weight hydroxy aryl compound such as phenol, cresol, β-naphthol, resorcinol, xylenol, cresylic acid or a mixture of such compounds in a weight ratio between about 1:1 and about 9:1 are preferred. The reaction of these materials to form the resins can be catalyzed by the addition of from about 2% to about 10% by weight, based on the aldehyde-hydroxy aryl compound mixture, of an alkaline catalyst such as guanidine carbonate, aminoquanidine bicarbonate, sodium hydroxide, sodium carbonate, ethyl amine, triethyl amine, aniline, ethylene diamine, or the like. From about 0.25% to about 10% by weight, based on the aldehyde-hydroxy aryl compound mixture, of an acid catalyst such as stannous chloride, magnesium chloride, hydrochloric acid, sulphuric acid, maleic anhydride, picric acid, benzene sulfonic acid, sulfanilic acid, α-naphthylamine sulphonic acid, sodium-1 naphthylamine-3,6,8-trisulphonate, or the like can be used.

The water-soluble aldehyde, the low molecular weight hydroxy aryl compound, and the catalyst employed for production of the phenol-formaldehyde type resins will normally be utilized in a two-stage procedure. The solution injected in the first stage of such a two-stage procedure will generally include all of the reactants except the low molecular weight hydroxy aryl compound. The solution injected in the second stage will generally be an oil solution which contains the hydroxy aryl compoud and is substantially immiscible with the first solution. The second solution displaces excess quantities of the first solution from the pore spaces in the formation, and at the same time contributes low molecular weight hydroxy aryl compound to the remaining portion of the first solution to permit reaction of the materials and formation of the resin. The use of phenol-formaldehyde resins and reactive mixtures which produce such resins has been described at length in the patent literature and will be familiar to those skilled in the art.

Epoxy resins can be used for purposes of the invention in lieu of the aldehyde type resins described above. Useful epoxies include the diglycidyl ethers of bisphenol A [bis-(4-hydroxy phenol) dimethyl methane] obtained by the reaction between epichlorohydrin (1-chloro-2,3 epoxy propane) and bisphenol A in the presence of an alkali such as sodium hydroxide or postassium hydroxide. Similar resins can be prepared by reacting a mono-nuclear di- or trihydroxy phenol such as resorcinol, hydroquinone, pyrocatechol, or chloroglucinol or a polynuclear polyhydroxy phenol such as 4,4-dihydroxy biphenyl with a halohydrin such as 1,2-dichloro-3-hydroxy propane or dichlorohydrin. Still other satisfactory materials include the commercial epoxy resins prepared by the condensation of novolac resins with epichlorohydrin.

The epoxy resins are employed in conjunction with curing agents or catalysts such as diethylene triamine, ethylene diamine, triethylene tetramine, dimethylamino propylamine, diethylamino propylamine, piperidine, menthane diamine, triethylamine, benzyldiethylenediethylamino phenol, ditrimethylaminomethylphenol, $\alpha$-methylbenzyl dimethylamine, meta xylenediamine, 4,4-methylene dianiline, and mixtures of such amines. Acidic catalysts such as oxalic acid, phthalic acid, pyromellitic acid, pyromellitic dianhydride, and dodecenyl succinic anhydride can also be employed.

The epoxy resins are preferably employed in two-stage operations in which the resin is first dissolved in a solvent such as a mixture of ethyl alcohol, acetone or ethyl ketone with kerosene, diesel oil or white oil containing added aromatics and injected into the formation and a kerosene or similar oil that is substantially free of aromatics and contains a catalyst or curing agent is thereafter injected. The latter solution displaces the resin solution from the pore spaces. Catalyst or curing agent contained in the second solution is extracted by the resin solution that remains in contact with the sand grains. In the presence of the extracted catalyst or curing agent the resin hardens and bonds the individual sand grains in place. The use of epoxy resins in both single-stage and two-stage sand consolidation processes has been described in the prior art.

Still other resins that may be employed in carrying out the invention include the furfuryl alcohol resins and the urea formaldehyde resins. The furfuryl alcohol formulations are generally utilized by injecting furfuryl alcohol, furfuryl alcohol resin, or a mixture of the alcohol and resin into the formation and thereafter pumping in an oil overflush solution containing a low molecular weight organic acid such as trichloroacetic acid or a delayed acid-producing chemical as a catalyst or curing agent. An oil preflush containing a surface active agent is generally used to remove water blocks and render the sand preferentially wet. The resin solution usually contains a surfactant and a silane compound designed to improve bonding to the sand grains. A diesel oil "spacer" is normally injected between the resin solution and the catalyst or curing agent solution containing urea, formaldehyde, an accelerator such as ammonium sulfate or ammonium chloride, and a retarder such as ammonium hydroxide or hexamethylene tetramine, into the formation and allowing the material to set. Magnesium chloride or similar chloride salt can be added to facilitate polymerization in carbonate formations. Further details concerning these furfuryl alcohol and urea formaldehyde resins can be found in the literature.

The resinous materials described above will normally be used in multiple stage processes but in some cases can also be employed in single stage operations. Difficulties due to the accumulation of resin on the pipe wall and in the collar recesses are most pronounced in the multiple stage jobs where the resin is injected first and the catalysts or hardener is later injected but may also be encountered to a lesser extent in operations where the resin and catalyst or hardener are premixed and then injected.

In a typical two-stage sand consolidation carried out in accordance with the invention, the well about which the sand is to be consolidated will normally first be killed by pumping in crude oil, diesel fuel, salt water, or a similar fluid through the tubing until sufficient hydrostatic head to overcome the fluid pressure in the formation has been created. If the well is a pumping well rather than a flowing well, the pumps, rods, and auxiliary equipment should then be removed. Once this has been done, accumulated sand can me removed from the wellbore by pumping salt water, diesel fuel or the like down the tubing string and up the annulus between the tubing and casing at a rate sufficient to entrain the sand particles and carry them to the earth's surface. The circulation of this fluid should be continued until the sand has been washed out of the wellbore to a level below the perforations. In new completions where there has been little or no production of fluids and entrained sand, this wash-out procedure may be unnecessary and can often be omitted.

If the well in which the consolidation operation is to be carried out is one from which there has been substantial production of fluids, cavities may have been formed in the producing formation behind the casing. These cavities should be filled with sand, gravel, glass beads, metallic shot, or similar particulate solids to prevent subsidence of the formation and damage to the casing. This can be done by suspending the sand, gravel, or other solids in salt water, diesel fuel, or similar fluid by means of a blender located on the earth's surface and then injecting the resultant slurry down the well into the perforations. A thickened fluid may be used to transport the solid particles if desired. It is normally preferred to employ particles having size in the range between about 20 mesh and about 4 mesh on the U.S. Sieve Series scale. Best results are normally obtained by using a material that has been screened so that all the particles fall into a relatively narrow size range. Wide variations in size promote close packing of the particles and result in lower permeability than may be obtained with more uniform particles. The size selected will depend in part on the permeability of the formation itself. In general, the use of 10 mesh or larger particles is preferred. Sand or gravel screened to substantially uniform size, 6 to 10 mesh for example, is particularly effective. Excess sand, gravel, or other solids remaining in the wellbore after the cavities have been filled can be removed by the circulation of additional fluid down the tubing and up the annulus between the tubing and casing. A packer can then be set between the tubing and casing to permit the injection of fluids into the formation. Following preparation of the well as described above, the tubing and casing are normally filled with diesel oil and injectivity of the formation is checked. Once this has been done, the consolidation operation can be started.

FIG. 1 in the drawing is a schematic diagram illustrating surface equipment that may be used in such a sand consolidation operation. The apparatus shown includes a preflush tank 10, a resin solution tank 11, an inert liquid tank 12, and a catalyst or hardener solution tank 13. These tanks will normally be mounted on a truck or trailer but in some cases skid mounted units may be used. The tanks are manifolded to pump intake line 14 so that fluid can be pumped from them by means of pump 15. Valves 16, 17, 18, and 19 are provided to permit the withdrawal of fluid from individual tanks. Line 20 extends from the discharge side of pump 15 to the well 21. Tank 12 containing the inert liquid is also provided with an outlet line 22 containing valve 23. This line is connected to the intake side of pump 24, from which discharge line 25 extends to the wellhead. At the wellhead, the upper end of the tubing string is provided with an injector into which the fluids from lines 20 and 25 are introduced. This injector is shown in vertical cross section in FIG. 2 of the drawing.

Figure 2:
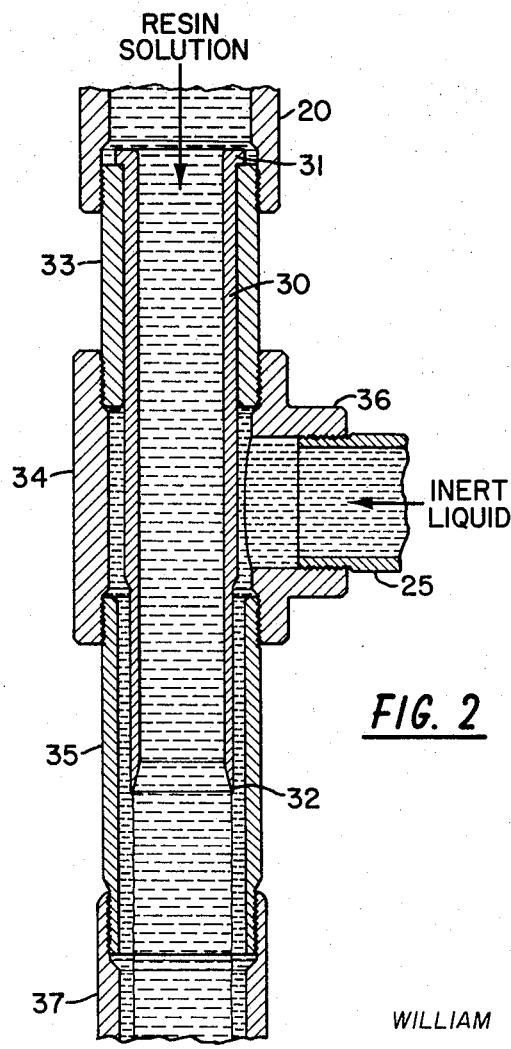
FIG. 2 is a vertical cross section through an injector which may be employed for purposes of the invention.

The injector shown in FIG. 2 includes an inner sleeve 30 provided with a retaining flange 31 at its upper end. The inner wall of this sleeve is tapered near the lower end to form a sharp edge indicated by reference numeral 32. A housing consisting of an upper section 33, an intermediate section 34, and a lower section 35 surrounds the inner sleeve. The sleeve is slightly tapered near its upper end so that it forms a fluid tight seal with the upper section below flange 31. Upper section 33 is connected at its upper end to line 20 from pump 15 and at its lower end is threaded into intermediate housing section 34. The intermediate section contains a lateral inlet 36 into which line 25 from pump 24 is connected. Lower housing section 35 extends downwardly from the intermediate section and is attached to the upper end of the well tubing 37 above the wellhead. The intermediate and lower housing sections are concentric with respect to the inner sleeve and form an annular passageway through which fluid introduced from line 25 moves downwardly into tubing string 37. The cross sectional area of the annular passageway will normally be between about 2% and about 15% of the cross sectional area of the inner sleeve. It is generally preferred that the outer wall of the sleeve and the inner wall of the lower housing section be smooth and essentially parallel to one another for a distance above the lower end of the sleeve equal to at least one sleeve diameter. This type of injector is particularly effective for purposes of the invention but other injectors capable of promoting the formation of an annular stream of one fluid about a central stream of the other may be used.

The preflush contained in tank 10 of FIG. 1 may be any of the fluids conventionally employed for this purpose. These include brines containing silane coupling agents; aqueous surfactant solutions; low molecular weight alcohols, aldehydes, and ketones such as methanol, acetaldehyde, and methyl ethyl ketone; and the like. Two particularly effective preflush agents are the aliphatic alcohols containing from 5 to 10 carbon atoms per molecule, particularly n-hexanol, and the alkyl ethers of $C_2$ to $C_6$ glycols having at least one $C_1$ to $C_6$ alkyl substituent attached to the molecule through an ether linkage, particularly ethylene glycol monobutyl ether. Studies have shown that these agents, when properly used, give results considerably better than those obtained with other preflush materials. The use of ethylene glycol monobutyl ether as a preflush is particularly effective.

The resin solution to be used in consolidating the formation is contained in tank 11 of FIG. 1. A typical solution may be an acetone solution containing about 60% by volume of a commercial epoxy resin solution such as CIBA Epoxy Resin No. 6005, manufactured by Ciba Products Company, Summit, N.J., and about 0.5% to 1% by volume of a bonding agent such as Dow-Corning Z–6020, a 2-aminoethyl-aminopropyl trimethoxy silane manufactured by the Dow-Corning Corporation, Midland, Mich. The epoxy solution used will normally have a viscosity at formation temperature of at least 1½ times that of the formation fluids. As pointed out above, phenol-formaldehydes and other resins can also be used.

The inert liquid used with the epoxy solution is contained in tank 12 of FIG. 1 and will normally be a paraffinic oil having a viscosity lower than that of the resin solution. Other inert, low viscosity liquids which are substantially immiscible with the resin solution can also be used. The particular inert liquid chosen will depend in part on the particular resin solution employed and may be varied as necessary.

The catalyst or hardener solution contained in tank 13 of FIG. 1 will also depend upon the particular resin employed. For the epoxy solution described above, a suitable catalyst solution is an acid treated kerosene, diesel oil, or white oil which is essentially free of aromatics and olefins and contains about 1% by volume of tridimethyl aminomethyl phenol or a similar catalyst. The viscosity of the catalyst solution will normally be about twice that of the resin solution. The resin and catalyst solutions should be substantially immiscible with one another. As indicated earlier, other resins will require the use of different catalysts or hardening agents.

As indicated above, silane compounds or similar materials may be employed as coupling agents in the preflush fluids if desired. The amino-functional organosilanes are generally preferred. Typical silanes that may be employed include 2-aminoethyl-aminopropyl-trimethoxy silane,
2-aminoethyl-aminopropyl-triethyleneoxide silane,
2-aminomethyl-aminopropyl-trimethoxy silane,
2-aminopropyl-aminopropyl-trimethoxy silane,
1-trimethoxy-2-aminoethyl-2-aminopropyl disilane,
1-triethyloxide-2-aminoethyl-2-aminopropyl disilane,
1-trimethoxy-2-aminopropyl-2-aminopropyl disilane, and
1-trimethoxy-2-aminoethyl-2-aminoethyl disilane.

These and similar compounds may be incorporated in the preflush solutions in concentrations in the range between about 0.1% and about 10% by weight but will preferably be employed between about 0.5% and about 2% by weight. Silanes can also be added to the resin solutions in similar concentrations if desired.

In carrying out the sand consolidation process of the invention, the preflush in tank 10 is injected first. This is done by opening valve 16, keeping valves 17, 18, and 19 closed, and then starting pump 15. The preflush discharged from the pump flows through line 20, sleeve 30, and tubing 37 into the formation. Injection is continued at matrix rates until from about 10 to about 100 gallons of preflush per foot of formation thickness has been introduced into the well. The optimum amount of preflush will depend in part on the particular agent selected, the resin to be used, the fluids present in the formation, and other considerations and may be varied as necessary. In general, however, from 10 to about 100 gallons per foot will give satisfactory results. Following injection of the preflush, valve 16 is closed and pump 15 is shut down. Depending on the preflush selected, the well may be allowed to stand for several hours. Experience has shown that best results are obtained with n-hexanol and certain other preflush agents by allowing the preflush to stand overnight in the formation before injection of the resin solution is started. With ethylene glycol monobutyl ether and similar preflushes, on the other hand, it is generally advantageous to omit the waiting period and commence injection of the resin-forming materials immediately. The use of these and other preflush agents has been described in the patent literature and will therefore be familiar to those skilled in the art.

After the waiting period, if any, injection of the consolidating chemicals is commenced. This is done by first opening valve 23 and starting pump 24. Inert liquid from tank 12, in this case a paraffinic oil of relatively low viscosity, is pumped through line 25 into the injector at the top of the tubing string. This fluid flows into the annular space between the inner sleeve 30 and the injector housing 34 and then moves downwardly into the tubing. Fluid remaining in the tubing string from the previous step may be displaced into the formation or, if desired, disposed of by unseating the packer and returning it to the surface through the tubing-casing annulus. After sufficient inert fluid to fill the upper part of the tubing string has been injected in this manner, valve 17 is opened and pump 15 is started. Resin solution from tank 11 is pumped through line 20 into the upper end of the injector at the wellhead. At the lower end of the injector, the stream of resin solution is surrounded by an annular film or layer of the less viscous inert fluid emerging from the annular space between the sleeve and housing. Because the two fluids are substantially immiscible with one another and have different viscosities, the annular film persists as the fluids move downwardly through the tubing string. This film isolates the viscous resin solution from the tubing wall and prevents its accumulation on the wall and in the collar recesses. It will normally also result in lower friction losses than would be incurred if the viscous resin solution were injected without the inert liquid. At the lower end of the tubing, the fluids emerge into the casing and flow through the perforations into the formation. The presence of the inert liquid, normally from about 5% to about 25% of the total fluid volume, generally has little or no adverse effect on the behavior of the resin solution within the formation but may require the injection of more resin than would otherwise be used. If desired, however, the amount of inert fluid entering the perforations can be reduced by unseating the packer above the unconsolidated zone and withdrawing fluids from the annulus at a controlled rate less than that at which the resin solution and the inert liquid are being introduced into the injector. Because of the density difference between the inert liquid and resin solution and the relatively low injection rates normally used, the two will tend to separate as they emerge from the tubing and hence much of the inert liquid can be recovered at the surface. Injection of the resin solution and inert liquid into the well is continued until sufficient resin to contact the formation for a distance of from 1 to 3 feet or more around the borehole has been introduced. The amount necessary for best results will depend, of course, on the extent to which sand has been washed out behind the casing, on the particular resin solution employed, and on other factors and may be varied as desired.

After the required volume of resin solution has been injected into the well, valve 17 is closed. Valve 18 is opened and additional inert liquid is pumped into the well to displace the injected resin solution and serve as a spacer between the resin and catalyst or curing agent solution. The volume of inert liquid employed for this purpose should be sufficient to avoid contact between the resin and catalyst or hardener in the tubing due to the mixing which occurs as fluids move down the tubing string. The inert liquid used to separate the resin solution from the catalyst or hardener solution to be injected later can be introduced simultaneously through lines 20 and 25 or instead can be injected through line 20 alone. If the latter procedure is used, valve 23 can be closed and pump 24 can be shut down.

Following injection of the required volume of inert liquid into the well behind the resin solution, valve 18 is closed and valve 19 is opened. Catalyst solution is then pumped from tank 13 into the well through line 20. This fluid moves downwardly through the injector sleeve and tubing, displacing the inert liquid in front of it, and flows through the perforations into the surrounding formation. Because essentially no resin solution remains in the tubing string, residues due to premature reaction between the resin and catalyst are avoided. If desired, the catalyst solution can also be isolated from the pipe wall with an inert liquid substantially immiscible with it. Within the formation, the catalyst solution displaces resin solution and inert liquid from the pore spaces between the sand grains. The resin solution contacting the sand grains is not displaced and instead remains in place as a film coating the sand surfaces. As the catalyst solution contacts this film, a portion of the catalyst is extracted by the film. This results in hardening of the resin making up the film so that the individual sand grains are cemented together to form a consolidated mass. The injection of catalyst solution is continued until sufficient solution to contact essentially all of the resin-coated sand has been introduced. The use of from about 2 to about 10 volumes of catalyst solution per volume of resin solution is generally preferred. After the catalyst solution has been injected, the well is normally shut in to permit hardening of the resin. The hardening period required depends in part on the reservoir temperature and the effectiveness of the particular catalyst or curing agent employed but in general hardening periods from 8 to about 72 hours are used. Following this, the well can be returned to production.

Although the process of the invention has been described above with reference to a sand consolidation operation using an epoxy resin, it will be understood that it can be used with other resins and is applicable in water shutoff processes and other operations which also require the injection of two or more reactive materials into a well in sequence. The use of an annular film or layer of inert liquid to surround the reactive material injected initially, the later-injected reactive material, or both avoids contact between the sequentially injected reactive materials on the wall of the tubing or casing and in the collar recesses. This in turn alleviates problems due to the premature formation of reaction products and thus simplifies the use of such materials in sand consolidation, water shutoff, and similar operations.

I claim:

1. A method for the injection of a liquid into a subterranean formation surrounding a well containing a string of tubing and casing which comprises injecting a central stream of said liquid and an annular stream of a less viscous substantially immiscible fluid having a lower density than said liquid down said string of tubing simultaneously while withdrawing fluid at the earth's surface from the annular space between said tubing and casing at a rate less than that at which said liquid and inert fluid are injected down said tubing.

References Cited

UNITED STATES PATENTS

| | | | |
|---|---|---|---|
| 3,167,034 | 1/1965 | Oakes et al. | 137—13 X |
| 3,176,767 | 4/1965 | Brandt et al. | 166—295 |
| 3,199,590 | 8/1965 | Young | 166—295 |
| 3,378,074 | 4/1968 | Kiel | 137—13 X |
| 3,414,004 | 12/1968 | Bankston | 137—13 X |
| 3,434,485 | 3/1969 | Lummus | 137—13 |
| 3,461,965 | 8/1969 | Robinson et al. | 166—308 |
| 3,022,825 | 2/1962 | Winsauer et al. | 166—295 |
| 3,294,166 | 12/1966 | Havenaar et al. | 166—295 |

MARVIN A. CHAMPION, Primary Examiner

J. E. EBEL, Assistant Examiner

U.S. Cl. X.R.

16—295, 300; 137—13